2 Sheets--Sheet 1.

WALTER W. HOLT.
Improvement in Corn Shellers.

No. 125,392.  Patented April 9, 1872.

Witnesses
Jno. A. Ellis
C. L. Evers

Inventor
Walter W. Holt,
Per,
J. J. Alexander
Atty

2 Sheets--Sheet 2.

WALTER W. HOLT.
Improvement in Corn Shellers.

No. 125,392.

Patented April 9, 1872.

125,392

UNITED STATES PATENT OFFICE.

WALTER W. HOLT, OF DUNKIRK, NEW YORK.

IMPROVEMENT IN CORN-SHELLERS.

Specification forming part of Letters Patent No. 125,392, dated April 9, 1872.

SPECIFICATION.

*To all whom it may concern:*

Be it known that I, WALTER W. HOLT, of Dunkirk, in the county of Chautauqua and State of New York, have invented certain new and useful Improvements in Corn-Shellers; and I do hereby declare that the following is a full, clear, and exact description thereof, reference being had to the accompanying drawing and to the letters of reference marked thereon, which forms a part of this specification.

My invention is especially intended as an improvement upon the corn-sheller for which Letters Patent were granted to Joshua S. Rackham, October 20, 1868; but I do not confine myself in the use of my improvements to the said corn-sheller, as they are applicable to all shellers having a vertical revolving cylinder surrounded by a vertical concave cylinder.

The nature of my invention consists, first, in a contrivance or device for a corn-sheller having a vertical revolving cylinder surrounded by a vertical concave cylinder, between which cylinders the corn to be shelled is passed, whereby the space between the two cylinders is regulated at pleasure by contracting or expanding the concave cylinder; second, in the arrangement of the teeth in the revolving cylinder in such rows and in such form that, however the corn may present itself to the cylinder, it will be at once turned to a vertical position, and so that it will retain this vertical position until discharged at the bottom; and, third, in the combination of the said adjustable concave cylinder with the spiral revolving cylinder, by which corn is shelled entirely clean, whether damp or dry, and great power saved.

In order to enable others skilled in the art to which my invention appertains to make and use the same, I will now proceed to describe its construction and operation, referring to the annexed drawing, in which—

Figure 1:
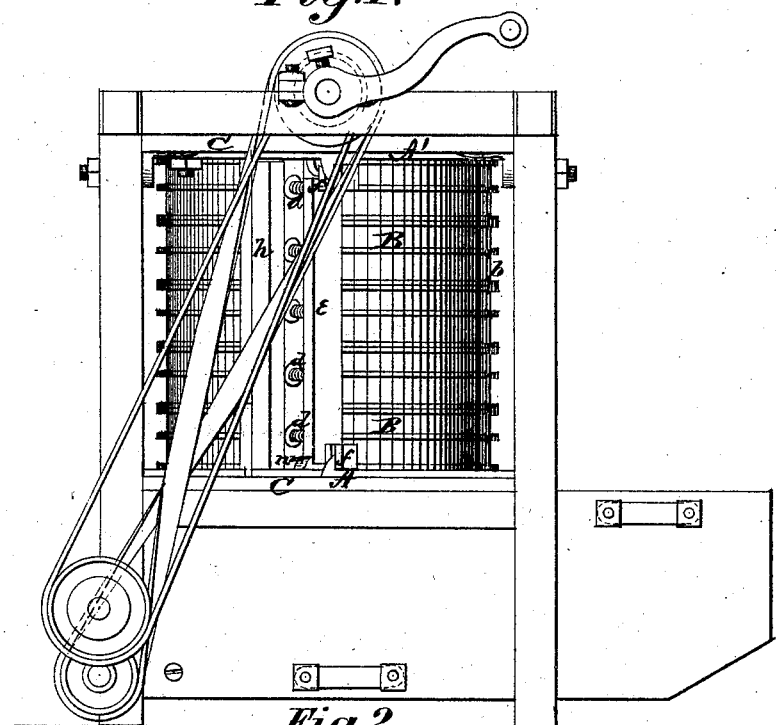
Figure 2:
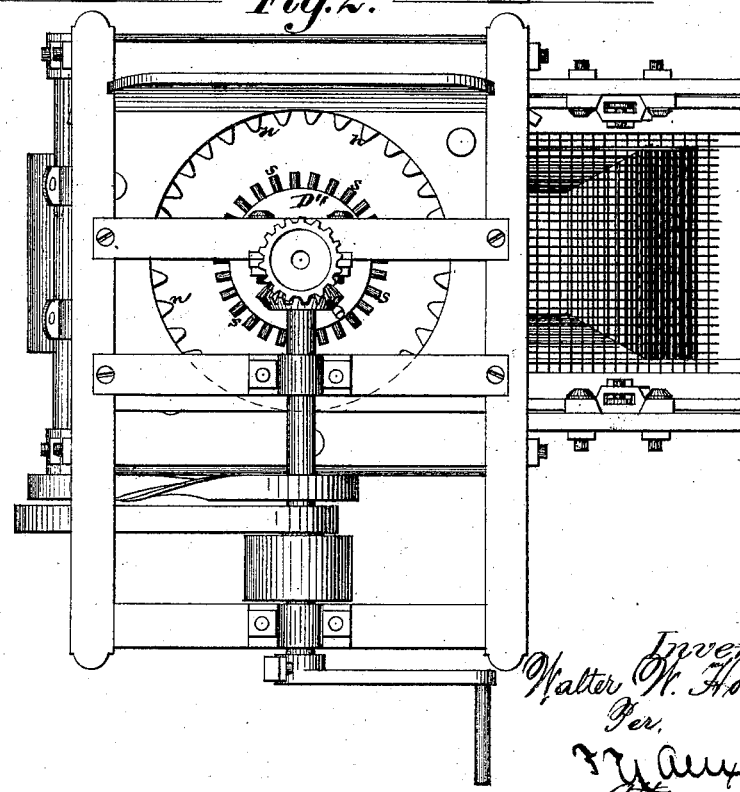
Figure 3:
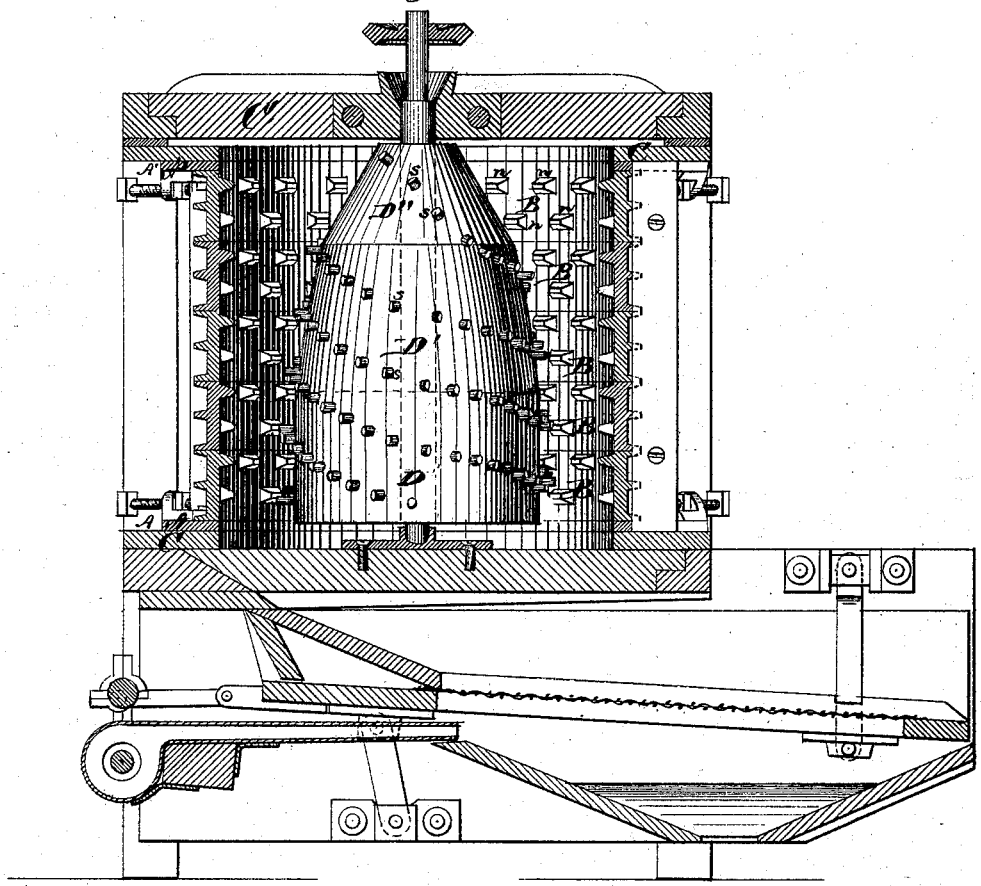
Figure 4:
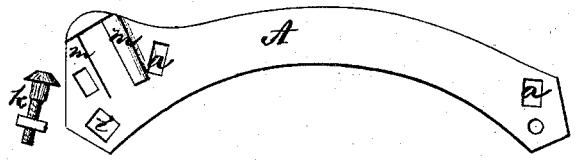

Figure 1 is a side elevation, Fig. 2 a plan view, and Fig. 3 a longitudinal vertical section of the corn-sheller of Rackham, above referred to, with my improvements attached thereto. Fig. 4 shows a section of the outer cylinder-frame.

The object of the first part of my invention is to reduce the space between the cylinder for shelling corn with small cobs, and to increase this space for shelling corn with large cobs, and thereby avoid the cutting and crushing of the cob when the space is too small, and the passage of the corn unshelled when the space is too large, so that the same machine may be used in shelling both large and small corn with perfect results.

I first construct a flat circular frame or plate, in which to confine the concave cylinder. The inside circle of this frame is made of the same diameter of the circle described by the inside of the concave cylinder. The outside of the frame is made in form and width to accommodate and hold the necessary attachments of the concave cylinder, and to give room for the slots, hereinafter mentioned, outside that part of the frame covered by the cylinder. This frame is in pieces; one half of the frame underlies the cylinder, the other half is placed on the top, and the cylinder is firmly confined between the top and bottom plates of this frame. When thus set up the inside circle of the frame and cylinder are in line with each other. The frame and cylinder are each divided into three equal sections, the lines which divide these several sections being vertical, and the points of division the same in both frame and cylinder. Each section of the cylinder is securely attached to its proper section of the frame, and the several sections are wholly independent of each other. This cylinder, when placed in the machine, is held to its position by means of bolts passing through slots in the cylinder-frame into the platforms of the machine. There are two such slots in the bottom frame and two in the top frame of each section.

In the drawing, A A represent the sections that form that half of the frame which underlies the cylinder; and A' A' represent the sections which form that half of the frame that is placed on the top. *a a* are the slots through the ends of each section A or A', through which the sections are bolted to the upper and lower platforms of the machine. The slots in each section are parallel with each other, and they are at right angles with a line drawn through the center of a circle, of which the section forms a part. B B represent five segments, which, together, form one section of the concave cylinder. These segments are hung upon a hinge-rod at one end, the other end being held to its work by springs. *b* is the hinge-rod, upon which these several segments are hung; *d d* are spiral springs, which keep the other ends of the several segments to their work. *e* is a movable post, by which the springs are held; and *f f* are set-bolts, which operate upon the spring posts, and regulate the pressure of the springs. *h* is a wooden post, against which one end of the segments work; the tenons of said post being inserted in slots *i i* in the frame-sections A A'. *k* is the bolt passing through the slot *a*, for fastening the frame-sections. The hinge-rod *b* passes through the frame at both top and bottom, and through all the segments. The spring-post *e* stands between the upper and lower frame, and works between two flanges, *m m*, seen in Fig. 4.

Each section of the cylinder is constructed in the same manner. These sections are so constructed that the segments on the inside at the hinge-end are in line with the frame A A'. The ends of the segments held by the springs *d d* are thrown forward by said springs until stopped by the wooden post *h*; and when so thrown forward this end of the segments reaches inside the circle described by the frame about five-eighths of an inch, so that the space between the hinge-end of the segments and the revolving cylinder is greater than the space between the spring-ends of the segments and this cylinder. When the three sections are severally set up they are placed in position in the machine between the platforms C C, the space between the same being just sufficient to receive them; they are then secured to the platforms by bolts through the several slots of the cylinder-frame A A'. The cylinder B is so placed that the revolving cylinder will be in the center of the same.

The concave cylinder is adjusted one section at a time. Loosen the nuts of the slot-bolts *k* of one section, and move the section out until sufficiently expanded; then turn the nuts up firmly, and secure and treat each of the other sections in the same manner. When the cylinder is thus expanded there may be small openings between the sections, in which case a strip is cut the length of the cylinder, one edge of the same beveled and inserted in the opening, and fastened there by any suitable means. To contract the cylinder move the sections in instead of out, care being taken that in all cases the space between the cylinder is as large as may be, and shell entirely clean. The interior of the cylinder B is provided with teeth *n n*, set in horizontal rows, the teeth of each row coming opposite the spaces between the teeth of the rows above and below.

The objects of the second part of my invention are to insure clean shelling, to prevent the lodgment of the corn in the concave cylinder, to carry the corn rapidly downward, to roll the cob over and over, thereby presenting all sides to the revolving cylinder, to prevent the breaking of the cob, which necessarily occurs when the ear runs horizontally around the cylinder, and to save the power otherwise lost in breaking and crushing the cob, and in clearing the cylinder of obstructions produced by clogging. The revolving cylinder is constructed so that its lower third D will be parallel with the sides of the concave, its middle third D' inclining slightly toward its own axis, and its upper third terminating in somewhat of an abrupt cone. The teeth *s s* are set in rows, each tooth being about half an inch in length, and from the center of one tooth to the center of the next is about one inch. The rows of teeth run around the cylinder spirally, the length of each row depending on the length of the cylinder. In a cylinder eighteen inches in length and ten and a half inches in diameter I make each row reach once and a half round the cylinder. Starting these rows they run around the cylinder against the sun and downward. In making this row I fix a starting point at the top; also the point I desire to reach at the bottom. I then make a perfect spiral line from one point to the other, drawing the line so that it will reach a point midway between the top and the bottom of the cylinder when it shall have passed three-fourths of the distance round the upper half of the cylinder, and continued from thence will reach the point at the bottom, when it shall have passed three-fourths round the lower half of the cylinder. All the rows are parallel and equally distant from each other. The number of rows required in a cylinder depends upon the number of revolutions intended to be made by it per minute.

In a cylinder ten and one-half inches in diameter at the bottom, making from seven hundred and fifty to eight hundred revolutions per minute, three such rows are required; if the number of revolutions is from five hundred to five hundred and fifty per minute there should be four rows.

The standard for the angle of the rows of teeth is a cylinder eighteen inches high and ten and a half inches in diameter, the row reaching once and a half around the cylinder, as above described. If the cylinders vary in length or in diameter the rows are to be put upon the cylinder spirally at the same angle found in the eighteen-inch cylinder, above described, without reference to the number of times the row reaches around the cylinder, or to where the row ends.

Both the cylinders and cylinder-frames should be made of cast-iron.

Having thus fully described my invention, what I claim as new, and desire to secure by Letters Patent, is—

1. The concave cylinder-frame plates made in sections A A', and each section made adjustable for adjusting the concave cylinder-sections out and in, substantially as and for the purposes herein set forth.

2. The combination of the section-segments B B, hinge-rod *b*, springs *d d*, post *e*, and set-screws *f f*, all constructed as described, and arranged in the frame-sections A A', substantially as and for the purposes herein set forth.

3. The revolving cylinder D D' D'', provided with teeth spirally arranged, in combination with sectional concave cylinder B, all constructed as described, and for the purpose set forth.

In testimony that I claim the foregoing as my own I affix my signature in presence of two witnesses.

WALTER W. HOLT.

Witnesses:
 JAMES SHEWARD,
 HENRY SMITH.